United States Patent
Kashima et al.

(10) Patent No.: US 9,869,809 B2
(45) Date of Patent: Jan. 16, 2018

(54) BACKLIGHT UNIT, LIQUID-CRYSTAL DISPLAY APPARATUS, AND STACKED STRUCTURE

(71) Applicant: Dai Nippon Printing Co., Ltd., Tokyo (JP)

(72) Inventors: Keiji Kashima, Tokyo (JP); Yasuki Suzuura, Tokyo (JP); Hiroshi Yamamoto, Tokyo (JP); Takashi Kuroda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 71 days.

(21) Appl. No.: 14/643,271

(22) Filed: Mar. 10, 2015

(65) Prior Publication Data

US 2015/0260903 A1 Sep. 17, 2015

(30) Foreign Application Priority Data

Mar. 12, 2014 (JP) .................................. 2014-048872
Jun. 3, 2014 (JP) .................................. 2014-115276

(51) Int. Cl.
*G02F 1/1335* (2006.01)
*F21V 8/00* (2006.01)

(52) U.S. Cl.
CPC .......... *G02B 6/0056* (2013.01); *G02B 6/0053* (2013.01); *G02B 6/0055* (2013.01)

(58) Field of Classification Search
CPC .. G02B 6/0053; G02B 6/0055; G02B 6/0056; G02F 2413/05; G02F 2001/133638;
(Continued)

(56) References Cited

U.S. PATENT DOCUMENTS 6,002,829 A * 12/1999 Winston .................... F21V 5/02
385/129
6,778,235 B2 * 8/2004 Takahashi ............ G02B 6/0048
349/65

(Continued)

FOREIGN PATENT DOCUMENTS

JP 06-265892 A 9/1994
JP H08254606 A 10/1996
(Continued)

OTHER PUBLICATIONS

Notification of Reasons for Refusal dated Oct. 3, 2017, issued to JP Patent Application No. 2014-048872.

*Primary Examiner* — Hoan C Nguyen
(74) *Attorney, Agent, or Firm* — Locke Lord LLP

(57) ABSTRACT

Sufficiently sharp directivity can be secured with a simple configuration in a configuration that improves the efficiency of utilizing the light exiting from a primary light source using a reflective polarizing plate. A backlight unit (2) supplies light exiting from an exit surface of a light guide plate (12) to a liquid-crystal display panel (3) via a reflective polarizing plate (16) after correcting directivity of the exiting light using a prism sheet (14) having a downwardly convex shape. A ¼-wavelength plate (15) is provided between the prism sheet (14) and the reflective polarizing plate (16), between the prism sheet (14) and the light guide plate, or between the light guide plate and a reflective sheet disposed on a surface of the light guide plate opposite to the prism sheet (14).

11 Claims, 17 Drawing Sheets

(58) Field of Classification Search
CPC ............. G02F 2413/01; G02F 1/13363; G02F 1/133536; G02F 1/1337
USPC .................................................. 349/96, 119
See application file for complete search history.

(56) References Cited

U.S. PATENT DOCUMENTS

| | | | |
|---|---|---|---|
| 7,106,397 B1* | 9/2006 | Kawamoto | G02B 5/3016 348/117 |
| 9,261,731 B2 | 2/2016 | Koike et al. | |
| 2002/0015120 A1 | 2/2002 | Kameyama et al. | |
| 2004/0085660 A1* | 5/2004 | Hara | G02B 5/287 359/883 |
| 2007/0064168 A1* | 3/2007 | Shiraogawa | G02B 27/28 349/56 |
| 2010/0045902 A1* | 2/2010 | Ikeda | G02B 5/045 349/96 |
| 2011/0013120 A1* | 1/2011 | Sun | G02F 1/133536 349/75 |
| 2013/0027634 A1* | 1/2013 | Saneto | G02F 1/133536 349/62 |
| 2013/0083276 A1* | 4/2013 | Iwahashi | B41M 3/06 349/117 |
| 2015/0301384 A1 | 10/2015 | Koike et al. | |

FOREIGN PATENT DOCUMENTS

| | | | |
|---|---|---|---|
| JP | H095505 A | | 1/1997 |
| JP | 2000-019325 A | | 1/2000 |
| JP | 2000-098372 A | | 4/2000 |
| JP | 2000-147488 A | | 5/2000 |
| JP | 2000227518 A | | 8/2000 |
| JP | 2005208416 A | * | 8/2005 |
| JP | 2009158468 | * | 10/2010 |
| JP | 2013047794 A | | 3/2013 |
| JP | 2013-190779 A | | 9/2013 |

* cited by examiner

FIG. 2

| CONSTRUCTION | PEAK LUMINANCE cd/m² | LIGHT-GUIDING DIRECTION AT HALF-WIDTH ANGLE | LIGHT-GUIDING VERTICAL DIRECTION AT HALF-WIDTH ANGLE | TOTAL LIGHT AMOUNT lm/m² |
|---|---|---|---|---|
| COMPARATIVE EXAMPLE 1 PENTAGONAL LGP, ACRYL BASE P, NO RETARDATION | 826.1 100% | 22.0 | 53.9 | 492.0 100% |
| EXAMPLE 1 PENTAGONAL LGP, ACRYL BASE P, RETARDATION 45° | 933.2 113% | 23.2 | 47.8 | 501.3 102% |
| COMPARATIVE EXAMPLE 2 PENTAGONAL LGP, ACRYL BASE P, RETARDATION 0° | 818.0 99% | 21.9 | 52.7 | 480.5 98% |
| COMPARATIVE EXAMPLE 3 PENTAGONAL LGP, MATTED PET BASE P, NO RETARDATION | 681.8 83%(100%) | 30.4 | 49.9 | 499.3 101%(100%) |
| COMPARATIVE EXAMPLE 4 PENTAGONAL LGP, MATTED PET BASE P, RETARDATION 45° | 720.9 87%(106%) | 30.6 | 50.1 | 492.6 100%(99%) |
| COMPARATIVE EXAMPLE 5 PENTAGONAL LGP, MATTED PET BASE P, RETARDATION 0° | 657.9 80%(96%) | 30.0 | 49.6 | 483.8 98%(100%) |
| COMPARATIVE EXAMPLE 6 90°-LGP, ACRYL BASE P, NO RETARDATION | 879.1 106%(100%) | 25.6 | 34.0 | 512.8 104%(100%) |
| EXAMPLE 2 90°-LGP, ACRYL BASE P, RETARDATION 45° | 959.8 116%(109%) | 27.3 | 33.7 | 520.7 106%(102%) |

BACKLIGHT UNIT, LIQUID-CRYSTAL DISPLAY APPARATUS, AND STACKED STRUCTURE

This application is based on and claims the benefit of priority from Japanese Patent Application No. 2014-048872, filed on 12 Mar. 2014, and Japanese Patent Application No. 2014-115276, filed on 3 Jun. 2014, the content of which is incorporated herein by reference.

BACKGROUND OF THE INVENTION

Field of the Invention

The present invention relates to a backlight unit, a liquid-crystal display apparatus, and a stacked structure, and specifically, relates to an edge-lit backlight unit in which light exiting from a primary light source, for example, enters a light guide plate from an edge (end surface) of the light guide plate and exits from an exit surface while propagating through the light guide plate and a liquid-crystal display apparatus which uses the edge-lit backlight unit.

Moreover, the present invention relates to a liquid-crystal display apparatus which improves the efficiency of utilizing light exiting from a primary light source using a reflective polarizing plate.

Related Art

Conventionally, in a liquid-crystal display apparatus, illumination light is supplied from an edge-lit backlight unit or the like to a liquid-crystal display panel to form a desired image. Moreover, in the edge-lit backlight unit, a primary light source is formed of a rod-shaped light source which uses a cold-cathode ray tube, a point-shaped light source which uses a light-emitting diode, and the like, and light exiting from the primary light source enters a light guide plate from an end surface (edge) of the light guide plate and propagates through the light guide plate. The light guide plate has countermeasures such as means for irregularly reflecting or diffusing the light which has been output from the primary light source and propagates through the light guide plate. Thus, the light guide plate gradually outputs light from an exit surface while allowing the light exiting from the primary light source to propagate through the light guide plate. In the edge-lit backlight unit, the light exiting from the light guide plate is supplied to a liquid-crystal display panel while correcting the directivity of the light using a prism sheet so that the light is directed in a front-surface direction of the exit surface. In this manner, in the edge-lit backlight unit, a surface light source provided for illumination of the liquid-crystal display panel is formed using the light exiting from the primary light source which is formed of a rod-shaped light source or a point-shaped light source.

With regard to such an edge-lit backlight unit, Patent Documents 1 and 2 propose a method of repeatedly forming a convex structure or the like having a pentagonal cross-sectional shape on an exit surface of a light guide plate to control the light exiting from the light guide plate so as to have sharp directivity in a front-surface direction of the exit surface to thereby improve the efficiency of utilizing the exiting light.

Moreover, Patent Document 3 discloses a structure in which a so-called reflective polarizing plate is disposed instead of a linear polarizing plate reflect the exiting light components of a backlight unit which have otherwise been absorbed by the linear polarizing plate so as to re-enter a light guide plate. According to this structure, it is possible to reutilize the re-entering output light and to improve the efficiency of utilizing the exiting light.

Further, Patent Document 4 discloses a configuration of a backlight unit in which a prism sheet having an upwardly convex shape is disposed on an exit surface of a light guide plate, and a ¼-wavelength plate and a reflective polarizing plate are sequentially disposed between the prism sheet and a liquid-crystal display panel. In this configuration, polarized light components reflected from the reflective polarizing plate are converted into circularly polarized light by the ¼-wavelength plate and re-enter the light guide plate, and the direction of the circularly polarized light is reversed when the circularly polarized light re-enters the light guide plate and is reflected inside the light guide plate. As a result, when the light exiting from the light guide plate re-enters the reflective polarizing plate, the light enters the reflective polarizing plate as the linearly polarized light that passes through the reflective polarizing plate. Due to this, in this configuration, the polarized light component reflected from the reflective polarizing plate is positively converted into polarized light components that pass through the reflective polarizing plate so as to further improve the light utilization efficiency.

However, the configuration disclosed in Patent Document 4 has a problem in that the configuration of the prism sheet becomes complex in order to supply the light exiting from the prism sheet to the liquid-crystal display panel with a sufficiently high peak light intensity and sharp directivity. Thus, such a configuration is not sufficient for practical use. That is, when the prism sheet is formed simply by repeatedly forming a convex structure having a triangular cross-sectional shape, desired directivity is secured by controlling an apex angle of the convex structure. However, in this case, it becomes difficult to suppress the sidelobe light sufficiently at an apex angle at which the peak light intensity is held at the largest value. As a result, it is necessary to focus on making changes on the cross-sectional shape of the convex structure and to take measures such as to form a light shielding portion in a partial region as disclosed in Patent Document 4.

Moreover, the display screen of a liquid-crystal display apparatus having the configuration disclosed in Patent Document 4 appears yellowish. Thus, such a configuration is not sufficient for practical use due to color tints of the display screen.

Patent Document 1: Japanese Unexamined Patent Application, Publication No. H08-254606
Patent Document 2: Japanese Unexamined Patent Application, Publication No. H09-5505
Patent Document 3: Japanese Unexamined Patent Application, Publication No. 2000-227518
Patent Document 4: Japanese Unexamined Patent Application, Publication No. 2013-47794

SUMMARY OF THE INVENTION

The present invention has been made in view of such circumstances, and an object thereof is to secure sufficiently sharp directivity with a simple configuration in a configuration of improving the efficiency of utilizing the light exiting from a primary light source using a reflective polarizing plate and as a result, to provide a high-efficiency and high-contrast liquid-crystal display apparatus.

Another object of the present invention is to improve color tints of a display screen in a configuration of improving the efficiency of utilizing the light exiting from a primary light source using a reflective polarizing plate.

As the result of repeated careful examinations to solve the problems, the present inventors have conceived an ideal of disposing a prism sheet having a downwardly convex shape, a ¼-wavelength plate, and a reflective polarizing plate sequentially on an exit surface of a light guide plate and have completed the present invention.

Further, the present inventors have conceived an ideal of configuring a ¼-wavelength plate so as to exhibit reverse wavelength dispersion characteristics and using a material having refractive-index isotropy as various light control sheets disposed between a reflective polarizing plate and a light guide plate and have completed the present invention.

Specifically, the present invention provides the following inventions.

(1) A backlight unit in which light exiting from an exit surface of a light guide plate is supplied to a liquid-crystal display panel via a reflective polarizing plate after correcting directivity of the exiting light using a prism sheet having a downwardly convex shape, wherein a ¼-wavelength plate is provided between the prism sheet and the reflective polarizing plate, between the prism sheet and the light guide plate, or between the light guide plate and a reflective sheet disposed on a surface of the light guide plate opposite to the prism sheet.

According to the backlight unit of (1), since a prism sheet having a downwardly convex shape is used, it is possible to secure sufficiently sharp directivity with a simple configuration as compared to a case of using a upwardly convex prism sheet. As a result, it is possible to provide a high-efficiency and high-contrast liquid-crystal display apparatus.

(2) The backlight unit according to (1), wherein a base of the prism sheet has a retardation value Re of 20 nm or smaller.

According to the backlight unit of (2), since the optical anisotropy of the base of the prism sheet can be suppressed sufficiently for practical use, it is possible to efficiently convert the polarized light component reflected from the reflective polarizing plate into a component that passes through the reflective polarizing plate.

(3) The backlight unit according to (1) or (2), wherein the prism sheet and the ¼-wavelength plate are integrated with each other.

(4) The backlight unit according to (1) or (2), wherein the ¼-wavelength plate and the reflective polarizing plate are integrated with each other.

(5) The backlight unit according to (1) or (2), wherein the prism sheet, the ¼-wavelength plate, and the reflective polarizing plate are integrated with each other.

(6) The backlight unit according to (1) or (2), wherein the ¼-wavelength plate and the reflective sheet are integrated with each other.

According to the backlight unit of (3), (4), (5), and (6), it is possible to reduce an air interface and to further improve the light utilization efficiency.

(7) A liquid-crystal display apparatus including: a liquid-crystal display panel stacked on the backlight unit according to any one of (1) to (6).

According to the liquid-crystal display apparatus of (7), it is possible to secure sufficiently sharp directivity with a simple configuration, and as a result, to provide a high-efficiency and high-contrast liquid-crystal display apparatus.

(8) A stacked structure in which a ¼-wavelength plate is provided so as to be integrated with a surface of a prism sheet in which a convex structure is repeatedly formed on a surface of a transparent base.

(9) A stacked structure in which a ¼-wavelength plate is integrated with a reflective polarizing plate.

(10) A stacked structure in which a ¼-wavelength plate and a reflective polarizing plate are sequentially provided so as to be integrated with a surface of a prism sheet in which a convex structure is repeatedly formed on a surface of a transparent base.

(11) A stacked structure in which a ¼-wavelength plate is integrated with a reflective sheet.

According to the stacked structure of (8), (9), (10), and (11), when the stacked structure is applied to a backlight unit that supplies light exiting from an exit surface of a light guide plate to a liquid-crystal display panel via a reflective polarizing plate after correcting directivity of the exiting light using a prism sheet having a downwardly convex shape, it is possible to reduce an air interface and to further improve the light utilization efficiency.

(12) The stacked structure according to (8) or (10), wherein the base of the prism sheet has a retardation value Re of 20 nm or smaller.

According to the stacked structure of (12), since the optical anisotropy of the base of the prism sheet can be suppressed sufficiently for practical use, it is possible to efficiently convert the polarized light component reflected from the reflective polarizing plate into a component that passes through the reflective polarizing plate.

(13) A liquid-crystal display apparatus in which at least a liquid-crystal display panel, a reflective polarizing plate, a ¼-wavelength plate that applies a retardation of ¼ wavelength to transmission light, a light control sheet that controls directivity of transmission light, and a light guide plate are sequentially stacked, wherein the ¼-wavelength plate exhibits reverse wavelength dispersion characteristics with respect to light reflected from the reflective polarizing plate so that a retardation applied to transmission light increases as the wavelength of the transmission light increases, and the light control sheet is formed of a material having refractive-index isotropy.

According to the liquid-crystal display apparatus of (13), when the light which has been reflected from the reflective polarizing plate and travels toward the light guide plate is converted into circularly polarized light by the ¼-wavelength plate, and the circularly polarized light passes through the ¼-wavelength plate toward the liquid-crystal display panel with a rotation direction of the circularly polarized light being reversed by the reflection on the light guide plate or the like, the circularly polarized light exits from a polarization plane in the direction of passing through the reflective polarizing plate. As a result, it is possible to positively convert the light reflected from the reflective polarizing plate into a component that passes through the reflective polarizing plate and to improve the light utilization efficiency to improve the luminance. In this configuration, since the ¼-wavelength plate exhibits reverse wavelength dispersion characteristics with respect to the light reflected from the reflective polarizing plate, and the light control sheet is formed of a material having refractive-index isotropy, the light reflected from the reflective polarizing plate re-enters and passes through the reflective polarizing plate without any color shift until the light is reflected from the reflective polarizing plate and re-enters the reflective polarizing plate. As a result, it is possible to improve color tints of the display screen.

(14) The liquid-crystal display apparatus according to (13), wherein
the ¼-wavelength plate includes:
a transparent base;
an alignment film formed on the transparent base; and
a retardation layer formed of a liquid crystal material having reverse wavelength dispersion characteristics and cured in a state in which the liquid crystal material is aligned by alignment restricting force of the alignment film.

According to the liquid-crystal display apparatus of (14), it is possible to form the ¼-wavelength plate using a liquid crystal material having reverse wavelength dispersion characteristics.

(15) The liquid-crystal display apparatus according to (13), wherein
the ¼-wavelength plate is a stacked structure including:
a ½-wavelength retardation layer that applies a retardation of ½ wavelength to transmission light; and
a ¼-wavelength retardation layer that applies a retardation of ¼ wavelength to transmission light.

According to the liquid-crystal display apparatus of (15), it is possible to form the ¼-wavelength plate using a liquid crystal material having positive wavelength dispersion characteristics so as to exhibit reverse wavelength dispersion characteristics with respect to the light reflected from the reflective polarizing plate.

(16) The liquid-crystal display apparatus according to any one of (13), (14), and (15), wherein
the light control sheet is a prism sheet in which a convex structure having a polygonal cross-sectional shape is repeatedly formed on an incidence surface or an exit surface.

According to the liquid-crystal display apparatus of (16), it is possible to sharpen the directivity of illumination light directed toward the liquid-crystal display panel with the aid of the light control sheet and to improve the luminance in the front-surface direction.

According to the present invention, it is possible to secure sufficiently sharp directivity with a simple configuration in a configuration of improving the light utilization efficiency of the light exiting from the primary light source using the reflective polarizing plate.

Moreover, according to the present invention, it is possible to improve the color tints of a display screen in a configuration that improves the light utilization efficiency of the light exiting from the primary light source using the reflective polarizing plate.

BRIEF DESCRIPTION OF THE DRAWINGS

FIG. 2 is a table provided for describing a backlight unit of the liquid-crystal display apparatus of FIG. 1.

DETAILED DESCRIPTION OF THE INVENTION

Figure 1:
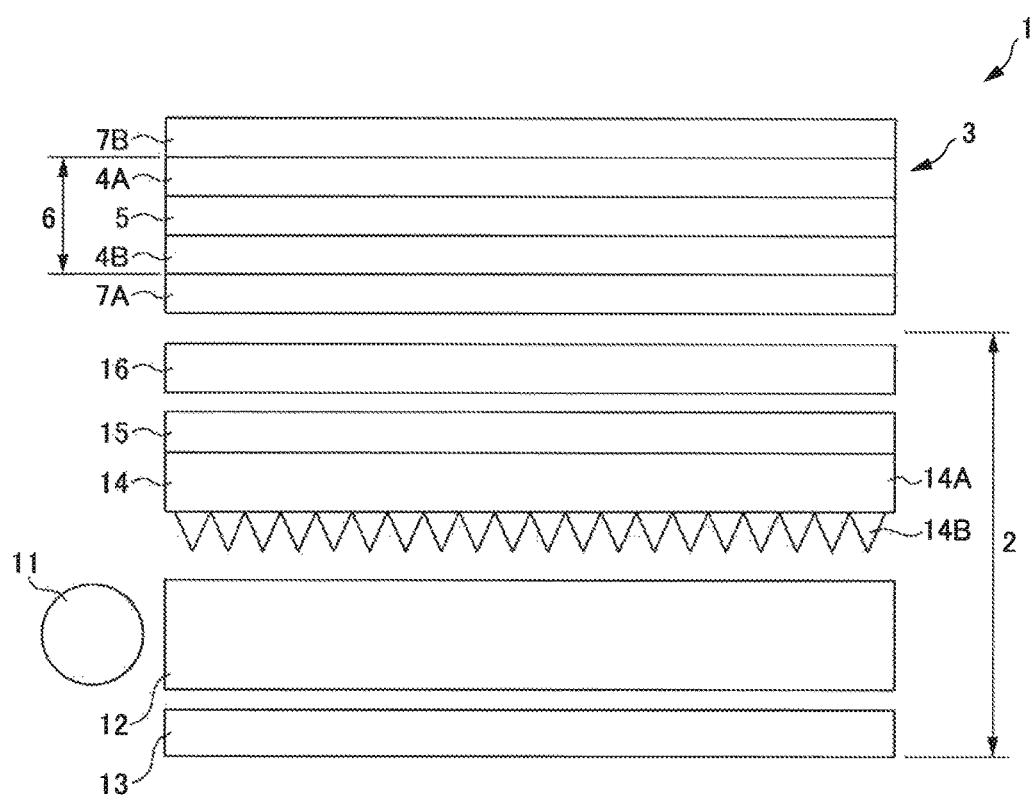
FIG. 1 is a cross-sectional view illustrating a liquid-crystal display apparatus according to a first embodiment of the present invention.

Hereinafter, embodiments of the present invention will be described with reference to the drawings.
(First Embodiment)
FIG. 1 is a cross-sectional view illustrating a schematic configuration of a liquid-crystal display apparatus according to a first embodiment of the present invention. This liquid-crystal display apparatus 1 is formed by stacking a backlight unit 2 and a liquid-crystal display panel 3. Here, the liquid-crystal display panel 3 has a configuration in which glass plates 4A and 4B having transparent electrodes formed therein sandwich a liquid crystal 5 to form a liquid crystal cell 6, and linear polarizing plates 7A and 7B are disposed on an incidence surface and an exit surface of the liquid crystal cell 6, respectively. With this configuration, the liquid-crystal display panel 3 modulates the intensity of the illumination light supplied from the backlight unit 2 according to driving of the transparent electrodes, outputs the modulated light, and displays a desired image. The liquid-crystal display panel may have a wide range of various types such as a twisted nematic (TN) type, a vertical alignment (VA) type, or an in-plane switching (IPS) type.

The backlight unit 2 is a so-called edge-lit backlight unit, in which a primary light source (in this embodiment, a rod-shaped light source which uses a cold-cathode ray tube) 11 is disposed along an end surface (hereinafter referred to as an incidence surface) of a light guide plate 12, and the light exiting from the primary light source 11 enters the light guide plate 12 from the incidence surface. With this configuration, in the backlight unit 2, the light exiting from the primary light source 11 exits from the exit surface of the light guide plate 12 while propagating through the light guide plate 12.

In the backlight unit 2, a reflective sheet 13 is disposed on a rear surface (a surface opposite the liquid-crystal display panel 3) of the light guide plate 12, the internally propagating light which leaks from the rear surface of the light guide plate 12 and propagates through the light guide plate 12 is caused to re-enter the light guide plate 12 by the reflective sheet 13. Thus, the light utilization efficiency is improved. Various types of reflective sheets such as a film material obtained by depositing a highly reflective metal material such as silver on various film materials, a sheet material formed of a white resin material, a regular-reflection member, or an irregular-reflection member can be used. However, a highly reflective, regular-reflection member is preferable in order to maintain high luminance and directivity.

Moreover, the backlight unit 2 has a configuration in which a prism sheet 14 having a downwardly convex shape, a ¼-wavelength plate 15, and a reflective polarizing plate 16 are sequentially disposed on the exit surface of the light guide plate 12. Here, the internally propagating light exiting from the exit surface of the light guide plate 12 is output with directivity obliquely inclined in the internal propagation direction while internally propagating toward a surface facing the incidence surface with the components having angles equal to or smaller than a critical angle being output from the exit surface.

The prism sheet 14 corrects the exiting light exiting from the light guide plate 12 with the directivity inclined obliquely in the internal propagation direction so that the light is output in a front-surface direction of the exit surface. The reflective polarizing plate 16 transmits a polarized light component having passed through the linear polarizing plate 7A of the liquid-crystal display panel 3 among the exiting light components from the prism sheet 14 which has passed through the ¼-wavelength plate 15 and enters the reflective polarizing plate 16 and reflects a polarized light component which has been absorbed by the linear polarizing plate 7A and is orthogonal to the polarized light component. The ¼-wavelength plate 15 applies a retardation of ¼ wavelength to the polarized light component of the linearly polarized light reflected from the reflective polarizing plate 16 to convert the linearly polarized light into a circularly polarized light and outputs the circularly polarized light to thereby improve the light utilization efficiency.

The light guide plate 12 is formed in an approximately planar shape using a transparent resin such as acryl or the like. A convex structure having a triangular cross-sectional shape or a convex structure having a pentagonal cross-sectional shape disclosed in Japanese Unexamined Patent Application, Publication No. H08-254606 and Japanese Unexamined Patent Application, Publication No. H09-5505 extends approximately vertically to the incidence surface and is repeated formed on the exit surface in a direction orthogonal to the extension direction. A slope surface which extends approximately in parallel to the incidence surface and has a function of guiding the light from the incidence surface so as to travel in a direction normal to the exit surface is formed repeatedly on a reflecting surface facing the exit surface in a direction orthogonal to the extension direction. Due to this, it is possible to output the internally propagating light with sharp directivity so that sidelobe light is suppressed. The convex structure may be formed so as to be integrated with a body portion according to injection molding or extrusion molding associated with forming of the light guide plate or may be formed in a transparent planar member according to molding which uses an ultraviolet-curable resin or the like.

However, when the prism sheet 14 having a downwardly convex shape, the ¼-wavelength plate 15, and the reflective polarizing plate 16 are sequentially disposed on the exit surface of the light guide plate 12 in this manner, it is possible to supply light to the liquid-crystal display panel 3 with a sufficiently high peak light intensity and sharp directivity using a prism sheet having a simple configuration. As a result, it is possible to provide a high-efficiency and high-contrast liquid-crystal display apparatus.

That is, when a prism sheet having an upwardly convex structure is used, the light exiting from the light guide plate passes through the prism sheet and enters both a primary light source-side slope surface (hereinafter referred to as a light source-side slope surface) of a convex shape of the triangular cross-sectional shape and a slope surface (hereinafter referred to as a reverse-side slope surface) on a reverse side of the light source-side slope surface. However, since the light entering the two slope surfaces has directivity inclined obliquely in the internal propagation direction, only the light entering the reverse-side slope surface is output with the directivity in the front-surface direction of the exit surface, whereas the directivity of the light entering the light source-side slope surface cannot be set to a desired direction. As a result, the light entering the light source-side slope surface becomes the cause of increasing the sidelobe light. Due to this, when an upwardly convex prism sheet is used, it is necessary to shield the light source-side slope surface from light so that the light exiting from the light guide plate does not enter the light source-side slope surface, which makes the configuration complex. Moreover, the inclination of the reverse-side slope surface, at which the peak light intensity in the front-surface direction is maximized, is different from the inclination at which the intensity of the sidelobe light can be suppressed as much as possible. Thus, it is necessary to make various changes on the cross-sectional shape itself of the convex structure.

In contrast, when the downwardly convex prism sheet is used, the light exiting from the light guide plate passes through the light source-side slope surface and enters the prism sheet, and is then reflected from the reverse-side slope surface so that the directivity thereof is corrected to the front-surface direction of the exit surface. Thus, even when no light shielding portion is provided, it is possible to output the light from the light guide plate with sharp directivity in the front-surface direction.

When a ¼-wavelength plate and a reflective polarizing plate are applied to a backlight unit which uses such an upwardly convex prism sheet (the configuration of Patent Document 4), the light returning to the light guide plate after having been reflected from the reflective polarizing plate is also blocked by the light shielding portion formed on the prism sheet, and the light loss caused by the light shielding portion increases.

In contrast, as in the present embodiment, when the downwardly convex prism sheet is used in combination with a ¼-wavelength plate and a reflective polarizing plate, it is possible to obviate the influence of the light shielding portion even on the light returning from the light guide plate after having been reflected from the reflective polarizing plate and to improve the light utilization efficiency as compared to the upwardly convex prism sheet.

In the present embodiment, as described above, the convex structure is formed on the exit surface of the light guide plate so as to provide sharp directivity. Thus, when the reflective polarizing plate is used in combination with such a light guide plate, the polarized light component reflected from the reflective polarizing plate passes through the convex structure of the light guide plate a number of times until the polarized light component passes through the reflective polarizing plate and exits the liquid-crystal display panel. As a result, the light entering the liquid-crystal display panel has a spread in a direction vertical to the extension direction of the convex structure.

However, as in the present embodiment, when the ¼-wavelength plate is provided, since the polarized light component reflected from the reflective polarizing plate can be positively converted into a polarized light component that passes through a reflective polarizing plate, it is possible to reduce the number of times the light passes through the convex structure of the light guide plate. As a result, it is possible to suppress a spread of light in the direction vertical to the extension direction of the convex structure.

(Prism Sheet and ¼-Phase Retardation Plate)

In the present embodiment, the prism sheet 14 is formed by repeatedly forming the convex structure 14B having a triangular cross-sectional shape, extending along the incidence surface of the light guide plate 12 on a base 14A formed of a transparent film material in a direction orthogonal to the extension direction of the convex structure 14B according to molding which uses an ultraviolet-curable resin. The prism sheet 14 may be formed using a thermosetting resin or the like instead of using an ultraviolet-curable resin and may be formed by pressing the base 14A directly by a mold. In the prism sheet 14, a material such as acryl of which the in-plane retardation value Re is 20 nm or smaller, and more preferably, of which the retardation value Re is 10 nm or smaller is used as the base 14A. Due to this, the backlight unit 2 controls the light having been reflected from the reflective polarizing plate and passed through the prism sheet 14 so that the retardation does not change greatly. In this way, a decrease in the light utilization efficiency is prevented.

Moreover, in the present embodiment, the ¼-wavelength plate 15 is formed so as to be integrated with the prism sheet 14. Due to this, a loss caused by an air interface between the ¼-wavelength plate 15 and the prism sheet 14 is obviated effectively and the light utilization efficiency is improved.

With regard to the integration, various integration methods can be applied, for example, when the ¼-wavelength plate 15 is formed so as to be integrated with the prism sheet 14 according to a transfer method, when the convex structure 14B is formed after a retardation layer associated with the ¼-wavelength plate 15 is formed on the base 14A, and when a retardation layer associated with the ¼-wavelength plate 15 is formed after the convex structure 14B is formed on the base 14A.

Here, the transfer method is a method in which, when a desired layer is formed on a base, for example, the layer is separably stacked and formed on a releasable support to form a transfer structure rather than forming the layer directly on the base, the layer formed on the support is attached and stacked on a base (a transfer target base) on which the layer is to be stacked depending on a step, demand, and the like, and then, the support is separated and removed to form the desired layer on the base. According to this transfer method, when an alignment film is formed on a support formed of various film materials, and then, coating liquid associated with a retardation layer is coated and dried and is irradiated with ultraviolet rays, a liquid crystal material associated with the retardation layer is solidified in an aligned state by the alignment restricting force of the alignment film. In this way, the retardation layer is formed. Subsequently, the retardation layer is attached to the base 14A using an adhesive layer such as an ultraviolet-curable resin layer, and then, the support is separated. When the prism sheet 14 is formed according to the transfer method, the convex structure 14B may be formed in advance of the base 14A and the convex structure 14B may be formed after the retardation layer is formed.

Moreover, when the convex structure 14B is formed after a retardation layer associated with the ¼-wavelength plate 15 is formed on the base 14A, an alignment film is formed on the base 14A, coating liquid associated with the retardation layer is coated and dried and is irradiated with ultraviolet rays to form the retardation layer, and then, the convex structure 14B is formed by molding.

When a retardation layer associated with the ¼-wavelength plate 15 is formed after the convex structure 14B is formed on the base 14A, a convex structure is formed on a base by molding, an alignment film is formed on the base 14A, and then, coating liquid associated with the retardation layer is coated and dried and is irradiated with ultraviolet rays to form the retardation layer.

The alignment film associated with the retardation layer can be formed according to a wide range of various methods such as a method of forming the same using an optical alignment film, a method of forming the same by molding a minute line-shaped uneven structure, or a method of forming the same by rubbing the surface.

FIG. 2 is a table illustrating evaluation results of a backlight unit. In FIG. 2, Comparative Example 1 is an example in which a downwardly convex prism sheet formed of an acryl material is disposed on a light guide plate (the conventional light guide plate disclosed in Patent Documents) in which a convex structure having a pentagonal cross-sectional shape is disposed on an exit surface to form a reflective polarizing plate without providing a ¼-phase retardation plate. Example 1 is a backlight unit of the above-described embodiment which uses the light guide plate in which a convex structure having a pentagonal cross-sectional shape is disposed on an exit surface. Comparative Example 2 is an example in which a fast axis direction of the ¼-phase retardation plate of the backlight unit of Example 1 is set to a transmission axis direction of the reflective polarizing plate. Comparative Examples 3, 4, and 5 are examples in which a matted polyethylene-terephthalate (PET) material is used as the base of a prism sheet in the configurations of Comparative Example 1, Example 1, and Comparative Example 2, respectively. Moreover, Comparative Examples 6 and Example 2 are examples in which a convex structure having a triangular cross-sectional shape having an apex angle of 90° is provided instead of the convex structure having a pentagonal cross-sectional shape in the configurations of Comparative Example 1 and Example 1, respectively.

In the configurations of FIG. 2, the ¼-wavelength plate was integrated by adhesion with the reflective polarizing plate instead of the prism sheet. Moreover, a so-called silver-deposited film which is a silver-deposited film material was used as the reflective sheet. Further, the retardation value Re of the base of the prism sheet was 18 nm.

In FIG. 2 a peak luminance indicates measured values and relative values when the measured peak luminance of Comparative Example 1 is 100%. A light-guiding direction at a half-width angle indicates a direction (internal propagation direction) from an incidence surface to a surface facing the incidence surface and a light-guiding vertical direction is a direction orthogonal to the light-guiding direction.

In FIG. 2, when Comparative Examples 1 and 2 are compared with Example 1, Comparative Examples 3 and 5 are compared with Comparative Example 4, and Comparative Example 6 is compared with Example 2, it can be understood that, when the ¼-wavelength plate is provided, the light reflected from the reflective polarizing plate is converted into circularly polarized light whereby the amount (peak luminance) of light output in the front-surface direction increases. Moreover, when Comparative Examples 3 to 5 are compared with Comparative Example 1, Example 1, and Comparative Example 2, it can be understood that, when the retardation value Re of the prism sheet is decreased, the amount of light output in the front-surface direction increases and the directivity can be sharpened.

In the present embodiment, since the downwardly convex prism sheet, the ¼-wavelength plate, and the reflective polarizing plate are sequentially provided on the exit surface of the light guide plate, it is possible to secure sufficiently sharp directivity with a simple configuration in a configuration of improving the light utilization efficiency of the light exiting from the primary light source using the reflective polarizing plate. As a result, it is possible to provide a high-efficiency and high-contrast liquid-crystal display apparatus.

Moreover, since the prism sheet and the ¼-wavelength plate are integrated, it is possible to reduce a loss caused by an air interface and to increase the amount of output light further.

(Second Embodiment)

Figure 3:
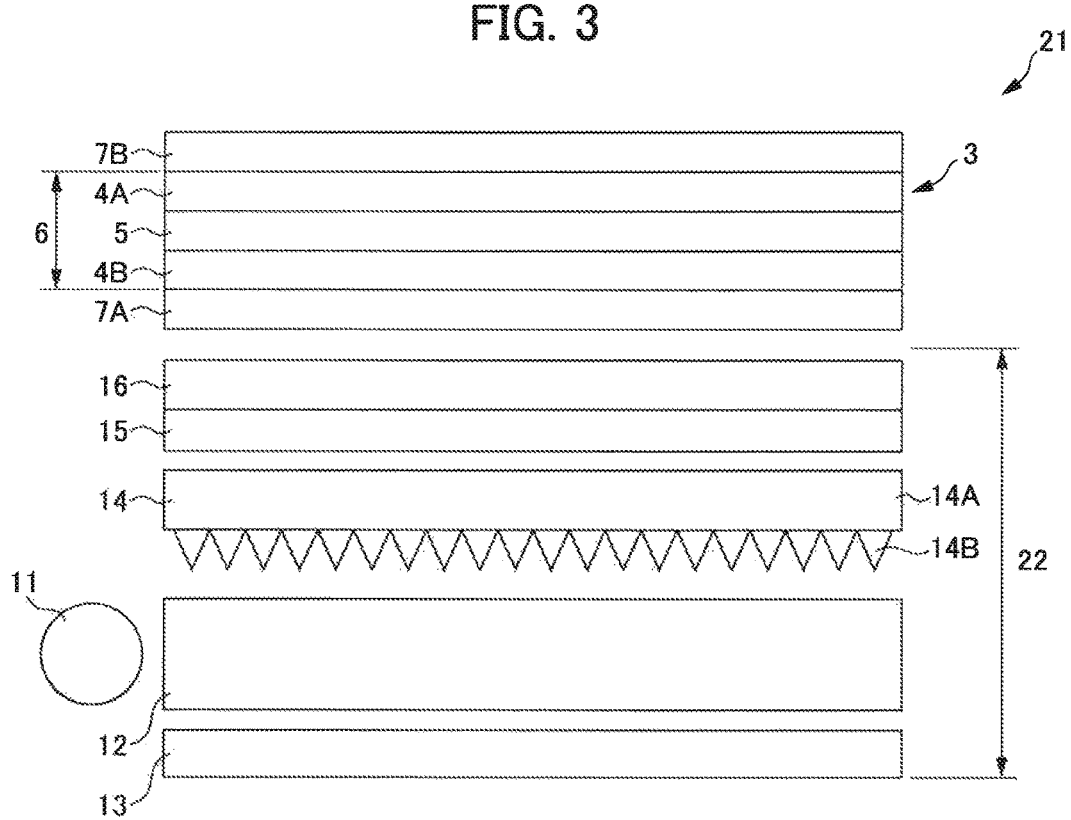
FIG. 3 is a cross-sectional view illustrating a liquid-crystal display apparatus according to a second embodiment of the present invention.

FIG. 3 is a diagram illustrating a liquid-crystal display apparatus according to a second embodiment of the present invention for comparison with FIG. 1. A liquid-crystal display apparatus 21 of the present embodiment has the same configuration as the liquid-crystal display apparatus 1 of the first embodiment except that a backlight unit 22 is disposed instead of the backlight unit 2. Moreover, the backlight unit 22 has the same configuration as the backlight unit 2 except that the ¼-wavelength plate 15 is disposed so as to be integrated with the reflective polarizing plate 16 instead of the prism sheet 14.

Here, with regard to the integration, the ¼-wavelength plate 15 may be provided so as to be integrated with the reflective polarizing plate 16 according to a transfer method. Alternatively, a retardation element associated with the ¼-wavelength plate 15 may be provided in the reflective polarizing plate 16. Further alternatively, the ¼-wavelength plate 15 may be attached to the reflective polarizing plate 16 by adhesion using an ultraviolet-curable resin or the like.

According to this transfer method, when an alignment film is formed on a support formed of various film materials, and then, coating liquid associated with a retardation layer is coated and dried and is irradiated with ultraviolet rays, a liquid crystal material associated with the retardation layer is solidified in an aligned state by the alignment restricting force of the alignment film. In this way, the retardation layer is formed on the support. Subsequently, the retardation layer is attached to the reflective polarizing plate 16 using an adhesive layer such as an ultraviolet-curable resin layer, and then, the support is separated. When integration is realized using a transfer method, the reflective polarizing plate 16 may be formed in advance and a retardation layer associated with the ¼-wavelength plate may be transferred to the reflective polarizing plate 16. Alternatively, a retardation layer associated with the ¼-wavelength plate may be transferred to a base associated with the reflective polarizing plate 16 and then, the reflective polarizing plate 16 may be formed.

Figure 4:
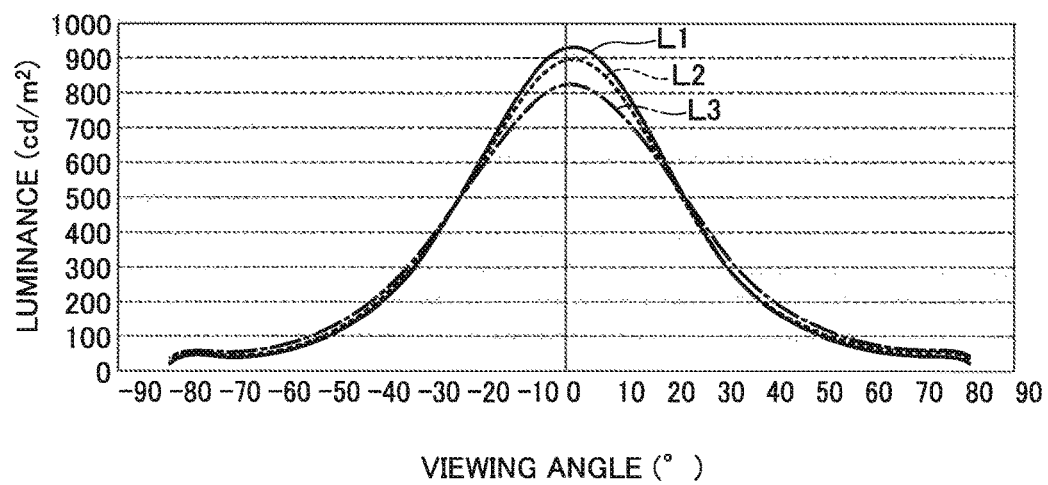
FIG. 4 is a diagram provided for describing a backlight unit of the liquid-crystal display apparatus of FIG. 2.
Figure 5:
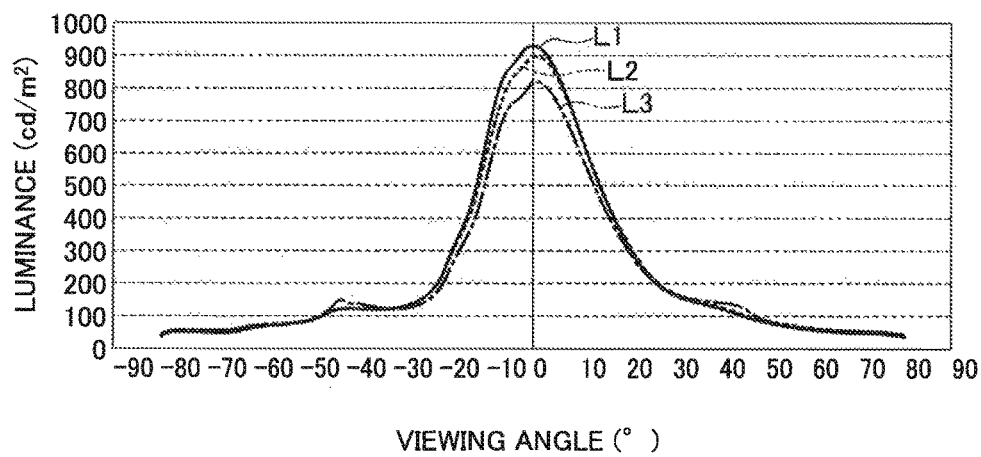
FIG. 5 is a diagram illustrating the directivity in a direction different from that of FIG. 4.
Figure 6:
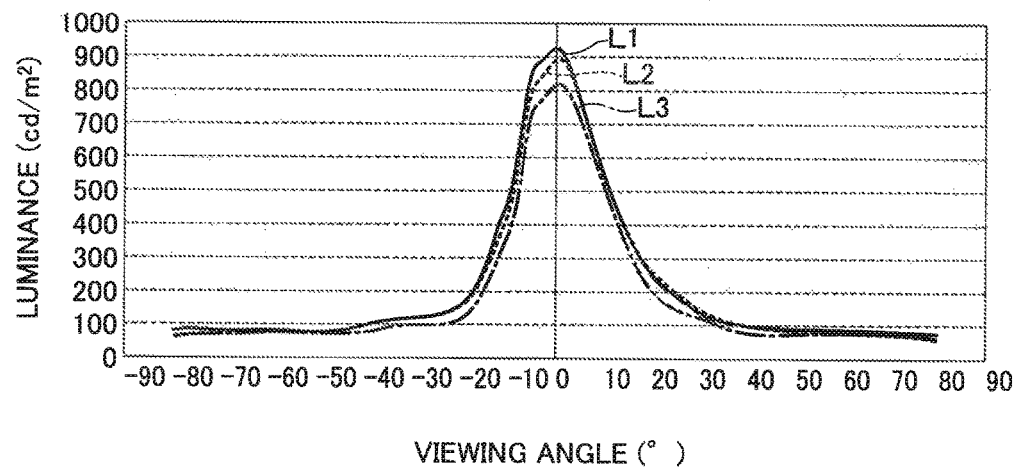
FIG. 6 is a diagram illustrating the directivity in a direction different from that of FIGS. 4 and 5.

FIGS. 4, 5, and 6 are characteristic curve diagrams illustrating the directivity in an internal propagation direction, a direction of 45° with respect to the internal propagation direction, and a direction orthogonal to the internal propagation direction. In FIGS. 4 to 6, symbol L1 indicates the measurement results of Example 1, symbol L2 indicates the measurement results when the reflective polarizing plate and the ¼-phase retardation plate are configured as separate plates in the configuration of Example 1, and symbol L3 indicates the measurement results of Comparative Example 1.

According to the configurations of FIGS. 4 to 6, it can be understood that, when the ¼-wavelength plate and the reflective polarizing plate are integrated so as to reduce an air interface, the amount of output light in the front-surface direction increases.

(Third Embodiment)

Figure 7:
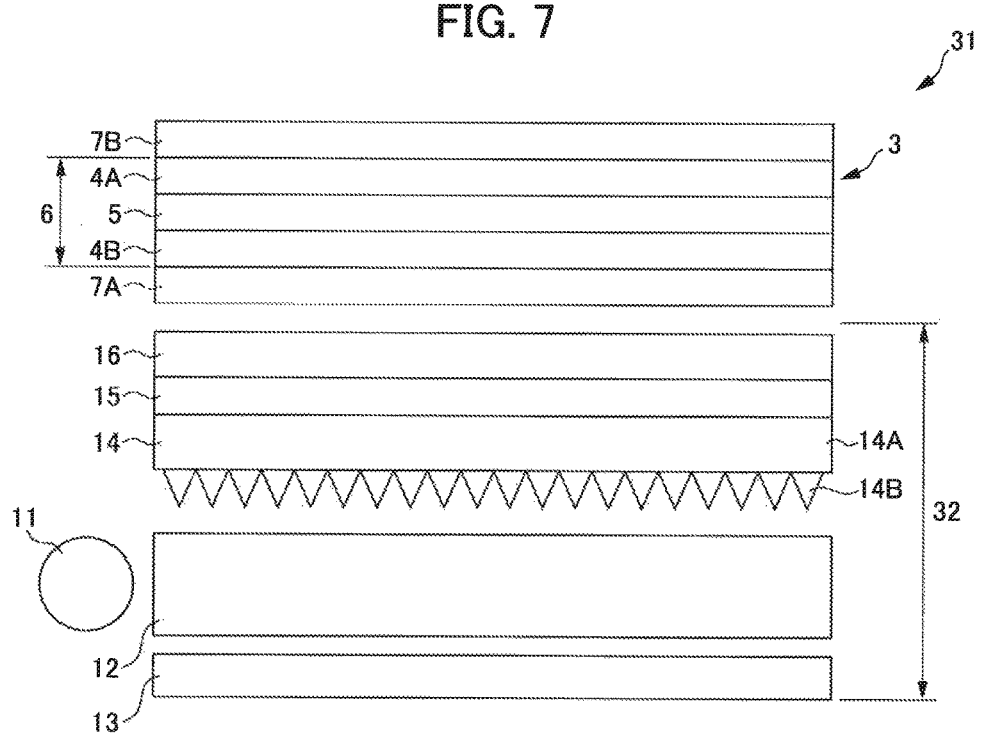
FIG. 7 is a diagram illustrating a liquid-crystal display apparatus according to a third embodiment of the present invention.

FIG. 7 is a diagram illustrating a liquid-crystal display apparatus according to a third embodiment of the present invention for comparison with FIG. 1. A liquid-crystal display apparatus 31 of the present embodiment has the same configuration as the liquid-crystal display apparatus 1 of the first embodiment except that a backlight unit 32 is disposed instead of the backlight unit 2. Moreover, the backlight unit 32 has the same configuration as the backlight unit 2 except that the reflective polarizing plate 16 is disposed so as to be integrated with the prism sheet 14 and the ¼-wavelength plate 15.

Here, in integration of the prism sheet 14, the ¼-wavelength plate 15, and the reflective polarizing plate 16, similarly to that described in connection with the first embodiment, the reflective polarizing plate may be integrated using an adhesive such as an ultraviolet-curable resin after the prism sheet 14 and the ¼-wavelength plate 15 are integrated. Alternatively, similarly to that described in connection with the second embodiment, the prism sheet 14 may be integrated using an adhesive such as an ultraviolet-curable resin after the ¼-wavelength plate 15 and the reflective polarizing plate 16 are integrated.

According to the present embodiment, since the reflective polarizing plate is integrated further, it is possible to reduce a loss caused by an air interface further and to provide the light exiting from the light guide plate to the liquid-crystal display panel more efficiently.

(Fourth Embodiment)

Figure 8:
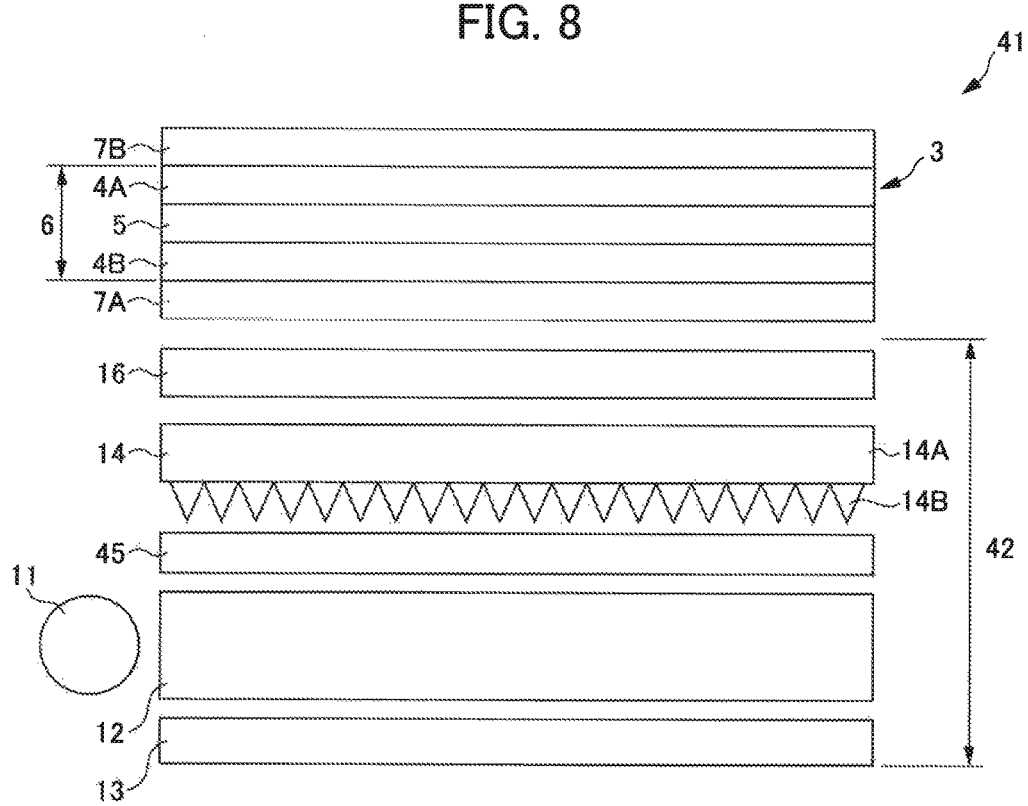
FIG. 8 is a diagram illustrating a liquid-crystal display apparatus according to a fourth embodiment of the present invention.

FIG. 8 is a diagram illustrating a liquid-crystal display apparatus according to a fourth embodiment of the present invention for comparison with FIG. 1. A liquid-crystal display apparatus 41 of the present embodiment has the same configuration as the liquid-crystal display apparatus 1 of the first embodiment except that a backlight unit 42 is disposed instead of the backlight unit 2. Moreover, the backlight unit 42 has the same configuration as the backlight unit 2 except that a ¼-wavelength plate 45 is disposed on the light guide plate 12 of the prism sheet 14 so as to be separated from the prism sheet 14.

Here, the ¼-wavelength plate 45 is formed by forming a retardation layer after an alignment film is formed on a transparent film material. The ¼-wavelength plate 45 is configured so as to apply a retardation of ¼ wavelength to the light exiting from the light guide plate 12 with obliquely inclined directivity by setting the thickness of the retardation layer.

Due to this, in the present embodiment, the polarized light component reflected from the reflective polarizing plate is converted into a circularly polarized light after the polarized light component passes through the prism sheet. The same advantage as the first embodiment can be obtained when the polarized light component reflected from the reflective polarizing plate is converted into a circularly polarized light after the polarized light component passes through the prism sheet as in the present embodiment.

(Fifth Embodiment)

Figure 9:
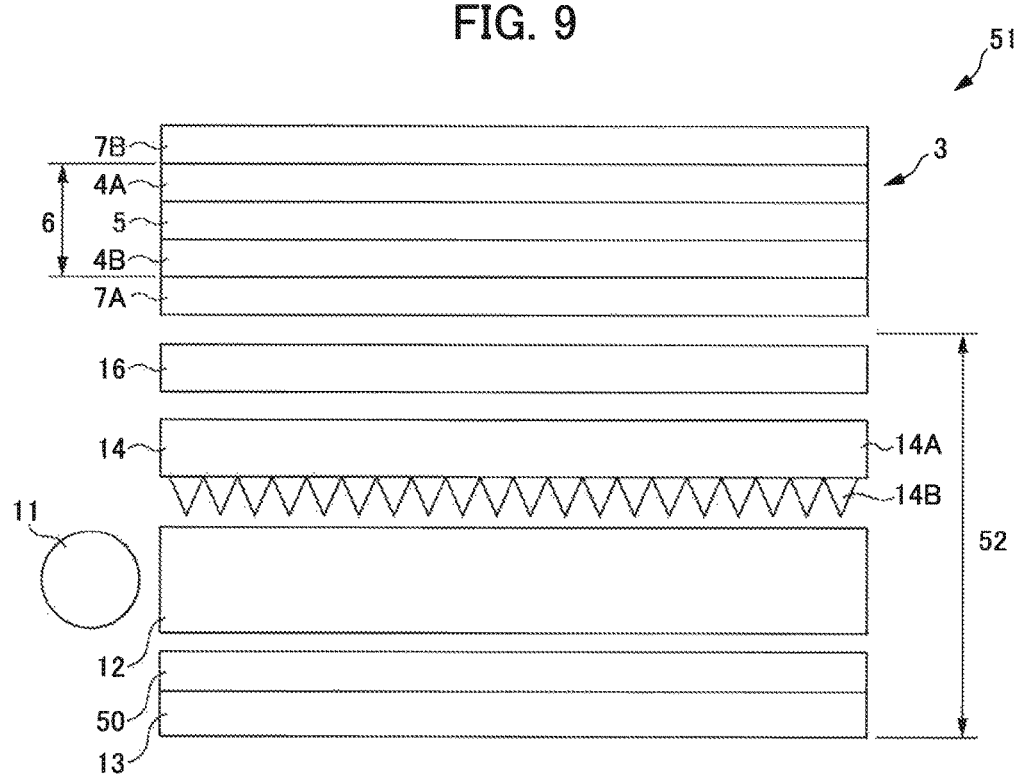
FIG. 9 is a diagram illustrating a liquid-crystal display apparatus according to a fifth embodiment of the present invention.

FIG. 9 is a diagram illustrating a liquid-crystal display apparatus according to a fifth embodiment of the present invention for comparison with FIG. 1. A liquid-crystal display apparatus 51 of the present embodiment has the same configuration as the liquid-crystal display apparatus 1 of the first embodiment except that a backlight unit 52 is disposed instead of the backlight unit 2. Moreover, the backlight unit 52 has the same configuration as the backlight unit 2 execpt that a ¼-wavelength plate 50 is disposed on the light guide plate 12 of the reflective sheet 13 so as to be integrated with the reflective sheet 13.

Here, the ¼-wavelength plate 50 is formed by forming a retardation layer after an alignment film is formed on a transparent film material. The ¼-wavelength plate 50 is configured so as to apply a retardation of ¼ wavelength to the light exiting from the light guide plate 12 toward the reflective sheet with obliquely inclined directivity by setting the thickness of the retardation layer.

Due to this, in the present embodiment, the polarized light component reflected from the reflective polarizing plate is converted into a circularly polarized light after the polarized light component passes through the prism sheet and the light guide plate. The same advantage as the first embodiment can be obtained when the polarized light component reflected from the reflective polarizing plate is converted into a circularly polarized light after the polarized light component passes through the light guide plate as in the present embodiment.

(Sixth Embodiment)

In the present embodiment, a +C plate is disposed on the light guide plate of the ¼-wavelength plate of the first to fourth embodiments described above so that the viewing-angle characteristics are improved by the +C plate. Here, the +C plate may be provided so as to be integrated with the ¼-wavelength plate, and may be provided so as to be integrated with another member on the light guide plate.

The same advantage as the above-described embodiments can be obtained when the +C plate is further provided as in the present embodiment.

(Seventh Embodiment)

Figure 10:
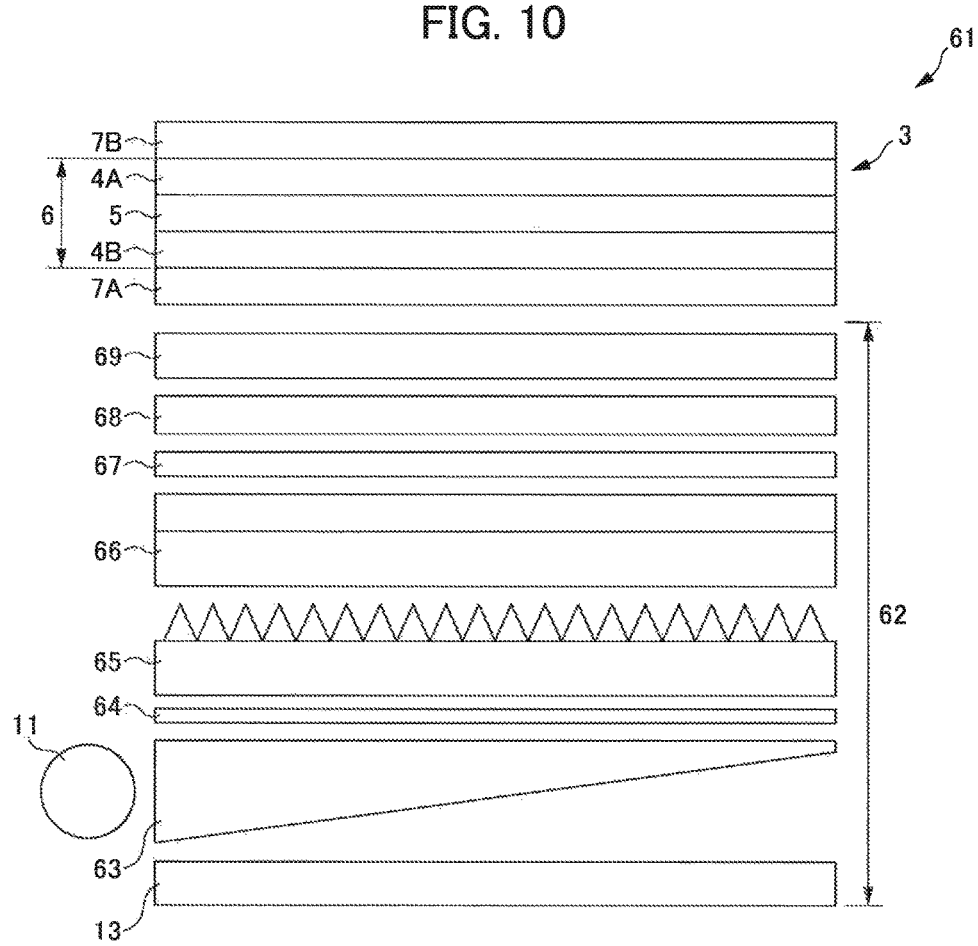
FIG. 10 is a cross-sectional view illustrating a liquid-crystal display apparatus according to a seventh embodiment of the present invention.

FIG. 10 is a diagram illustrating a liquid-crystal display apparatus according to a seventh embodiment of the present invention for comparison with FIG. 1. A liquid-crystal display apparatus 61 of the present embodiment has the same configuration as the liquid-crystal display apparatus 1 of the first embodiment except that a backlight unit 62 is disposed instead of the backlight unit 1.

The backlight unit 62 is a so-called edge-lit backlight unit, in which a primary light source (in this embodiment, a rod-shaped light source which uses a cold-cathode ray tube) 11 is disposed along an end surface (an incidence surface) of a light guide plate 63 which is a planar member having a wedge shape in a cross-sectional view, and the light exiting from the primary light source 11 enters the light guide plate 63 from the incidence surface. With this configuration, in the backlight unit 62, the light exiting from the primary light source 11 exits from the exit surface of the light guide plate 63 while propagating through the light guide plate 63. The light guide plate 63 may be formed in a flat plate-like shape. Moreover, a direct backlight unit may be used instead of the edge-lit backlight unit.

In the backlight unit 62, a reflective sheet 13 is disposed on a rear surface (a surface opposite the liquid-crystal display panel 3) of the light guide plate 63, the internally propagating light which leaks from the rear surface of the light guide plate 63 and propagates through the light guide plate 63 is caused to re-enter the light guide plate 63 by the reflective sheet 13. Thus, the light utilization efficiency is improved. Various types of reflective sheets such as a film material obtained by depositing a highly reflective metal material such as silver on various film materials, a sheet material formed of a white resin material, a regular-reflection member, or an irregular-reflection member can be used. However, a highly reflective, regular-reflection member is preferable in order to maintain high luminance and directivity.

Moreover, the backlight unit 62 has a configuration in which light control sheets 64, 65, 66, and 67 that control the directivity of transmission light, a ¼-wavelength plate 68, and a reflective polarizing plate 69 are sequentially disposed on the exit surface of the light guide plate 63. Here, various light control sheets can be used depending on the viewing-angle characteristics required for the liquid-crystal display apparatus 1. In the present embodiment, a light-diffusing sheet 64, a upwardly convex prism sheet 65, a upwardly convex prism sheet 66, and a light-diffusing sheet 67 are used. Here, the light-diffusing sheets 64 and 67 are used for the purpose of mitigating the directivity of illumination light supplied to the liquid-crystal display panel 3 and preventing the occurrence of a moire pattern or the like. A wide range of various configurations such as a transparent film material in which various fine particles are mixed or a surface-roughened transparent film material can be used as the light-diffusing sheets 64 and 67. The prism sheets 65 and 66 are transparent sheet materials in which a convex structure having a polygonal cross-sectional shape is repeatedly formed on an incidence surface or an exit surface and are configured to output the entering light while correcting the directivity so as to have sharp directivity in the front-surface direction. In the present embodiment, the prism sheet 65 is formed such that the convex structure having the polygonal cross-sectional shape is formed by repeatedly forming a convex structure which has a triangular cross-sectional shape having an apex angle of 90° and extends in an extension direction of the primary light source in the direction orthogonal to the extension direction on the side surfaces of the liquid-crystal display panel 3. Due to this, in the liquid-crystal display apparatus 61, the directivity of the illumination light exiting from the exit surface of the light guide plate 63 with the directivity obliquely inclined in the internal propagation direction is corrected to the front-surface direction of the exit surface. The prism sheet 66 is formed by repeatedly forming the same convex structure having a triangular cross-sectional shape in the direction orthogonal to the convex structure of the prism sheet 65. Due to this, the prism sheet 66 corrects the directivity associated with this repetition direction to sharp directivity and outputs the transmission light. The prism sheet(s) 65 and/or 66 may be disposed so as to be obliquely inclined by some degrees in the extension direction of the primary light source so as to prevent the occurrence of a moire pattern.

The light control sheets 64, 65, 66, and 67 disposed between the light guide plate 63 and the ¼-wavelength plate 68 are formed of a material having refractive-index isotropy. Due to this, the light which has been reflected from the reflective polarizing plate 69 and has passed through the ¼-wavelength plate 68 and the light which has been output from the light guide plate 63 and enters the ¼-wavelength plate 68 are suppressed from experiencing a retardation in the in-plane direction of the ¼-wavelength plate 68 as much as possible.

Here, the material having refractive-index isotropy is a material having a small optical anisotropy, and a resin material having a small refractive-index anisotropy such as a cyclic olefin resin, an acryl resin, or acetyl cellulose can be used. Moreover, a material of which the in-plane retardation Re(550) is 20 nm or smaller when the material is processed into a light control sheet is preferable. More preferably, Re(550) is 10 nm or smaller, and further preferably, is 5 nm or smaller. Due to this, in the present embodiment, the light control sheet prevents a color shift in the light which is output from the light guide plate 63 and re-enters the reflective polarizing plate 69 after being reflected from the reflective polarizing plate 69 and entering the light guide plate 63 in cooperation with the ¼-wavelength plate 68 described later and improves the color tints of the display screen.

The reflective polarizing plate 69 transmits a polarized light component having passed through the linear polarizing plate 7A of the liquid-crystal display panel 3 among the exiting light components from the light-diffusing sheet 67 which has passed through the ¼-wavelength plate 68 and enters the reflective polarizing plate 69 and reflects a polarized light component which has been absorbed by the linear polarizing plate 7A and is orthogonal to the polarized light component. The ¼-wavelength plate 68 applies a retardation of ¼ wavelength to the polarized light component of the linearly polarized light reflected from the reflective polarizing plate 69 to convert the linearly polarized light into a circularly polarized light and outputs the circularly polarized light to thereby improve the light utilization efficiency.

Here, the reflective polarizing plate 69 may use various configurations such as a linear polarizing plate on which a birefractive resin is stacked, a circular polarizing plate obtained by combining a cholesteric liquid crystal and a ¼-wavelength plate, or a wire grid polarizing plate.

In the present embodiment, the ¼-wavelength plate 68 is configured so as to exhibit reverse wavelength dispersion characteristics with respect to the light reflected from the reflective polarizing plate 69 so that a retardation applied to transmission light increases as the wavelength of the transmission light increases. Due to this, in the present embodiment, it is possible to reduce a color shift sufficiently and to improve the color tints of the display screen in cooperation with the configuration of the light control sheet described above.

That is, in the liquid-crystal display apparatus 61, the light which has been reflected from the reflective polarizing plate 69 and enters the ¼-wavelength plate 68 is applied with a retardation of ¼ wavelength by the ¼-wavelength plate 68 and is output from the ¼-wavelength plate 68 as circularly polarized light. Moreover, the light exiting from the ¼-wavelength plate 68 enters the ¼-wavelength plate 68 with a rotation direction in a polarization plane of the circularly polarized light being reversed by the reflection on the reflective sheet 13 or the like. In this case, the exiting light is converted into a linearly polarized light by the polarization plane in the direction of passing through the reflective polarizing plate 69 and the linearly polarized light is output toward the reflective polarizing plate 69.

Here, when the ¼-wavelength plate has positive wavelength dispersion characteristics or flat wavelength dispersion characteristics of the ordinary liquid crystal material, the transmission light of the ¼-wavelength plate 68 which has entered from the reflective polarizing plate 69 is output as circularly polarized light having different ellipticity depending on wavelength. Moreover, the circularly polarized light exiting from the light guide plate 63 is applied with a retardation of which the wavelength conversion amount is different depending on wavelength when the light passes through the ¼-wavelength plate, and circularly polarized light or linearly polarized light of which the ellipticity of which the long-axis direction is the direction of a polarization plane passing through the reflective polarizing plate 69 is different depending on wavelength is output from the ¼-wavelength plate. Due to this, the illumination light which re-enters the reflective polarizing plate with the light guide plate interposed after having been reflected from the reflective polarizing plate in this manner experiences a color shift, and as a result, the display screen appears yellowish.

However, as in the present embodiment, when the ¼-wavelength plate 68 exhibits reverse wavelength dispersion characteristics and wavelengths are different, the transmission light of the ¼-wavelength plate 68 which has been reflected from the reflective polarizing plate 69 and has entered the ¼-wavelength plate 68 is output as circularly polarized light in which a change with wavelength is decreased remarkably as compared to when the ¼-wavelength plate has positive wavelength dispersion characteristics or flat wavelength dispersion characteristics and of which the ellipticity is approximately 1. Moreover, even when the circularly polarized light is reflected from the reflective sheet 13 and passes through the ¼-wavelength plate 68, the light exits from the ¼-wavelength plate 68 toward the reflective polarizing plate 69 in a state in which a change with wavelength is decreased remarkably as compared to when the ¼-wavelength plate has positive wavelength dispersion characteristics or flat wavelength dispersion characteristics. Due to this, even when wavelengths are different, it is possible to utilize the light reflected from the reflective polarizing plate 69 efficiently and to reduce a color shift to improve the color tints of the display screen.

Thus, even when the ¼-wavelength plate 68 is configured to exhibit reverse wavelength dispersion characteristics in this manner, since a large retardation is applied to the transmission light when the light passes through the light control sheets 64 to 67, the amount of light entering the reflective polarizing plate 69 decreases due to the polarization plane in the direction of passing through the reflective polarizing plate 69 among the illumination light components reflected from the reflective polarizing plate 69. Further, the color shift increases due to a retardation applied when light passes through the light control sheet 64 to 67. Due to this, in the present embodiment, even when the light control sheets 64 to 67 are formed of a material having refractive-index isotropy, it is possible to reduce a color shift and to improve the color tints of the display screen.

Figure 11:
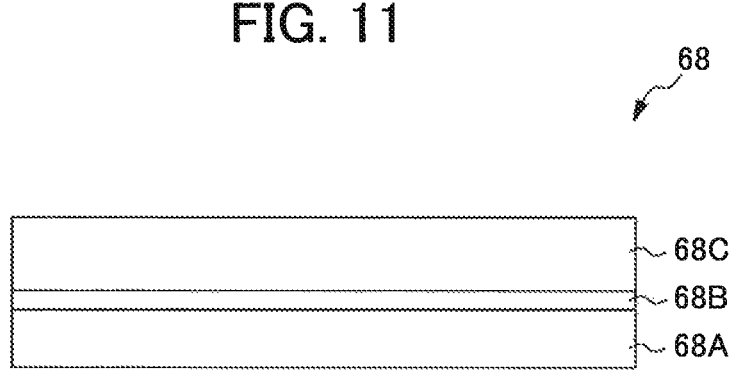
FIG. 11 is a cross-sectional view illustrating a ¼-wavelength plate of the liquid-crystal display apparatus of FIG. 10.

FIG. 11 is a cross-sectional view illustrating a configuration of the ¼-wavelength plate 68. In the ¼-wavelength plate 68, an alignment film 68B is formed on a base 68A formed of a transparent film of triacetyl cellulose (TAC) or the like, for example, which has small optical anisotropy, and a retardation layer 68C that applies a retardation of ¼ wavelength to transmission light is formed on the alignment film 68B. Here, the retardation layer 68C is formed of a liquid crystal material having reverse wavelength dispersion characteristics, which is cured in a state in which the liquid crystal material is aligned by alignment restricting force of the alignment film 68B.

More specifically, the liquid crystal material may use liquid crystal composition having reverse wavelength dispersion characteristics disclosed, for example, in Japanese Unexamined Patent Application, Publication No. 2010-627892, Japanese Unexamined Patent Application, Publication No. 2006-243470, Japanese Unexamined Patent Application, Publication No. 2007-243470, Japanese Unexamined Patent Application, Publication No. 2009-75494, Japanese Unexamined Patent Application, Publication No. 2009-62508, Japanese Unexamined Patent Application, Publication No. 2009-679563, Japanese Unexamined Patent Application, Publication No. 2009-242767, Japanese Unexamined Patent Application, Publication No. 2009-242768, Japanese Patent No. 4222360, Japanese Patent No. 4686981, and the like.

A liquid crystal composition below, for example, can be used as the liquid crystal material which can be used for the ¼-wavelength plate 68.

(1)
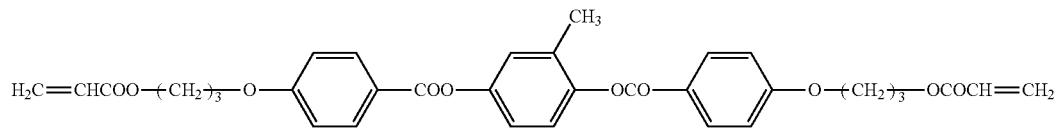

(2)
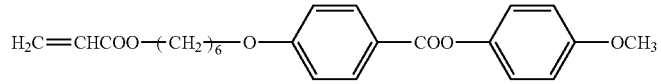

(3)
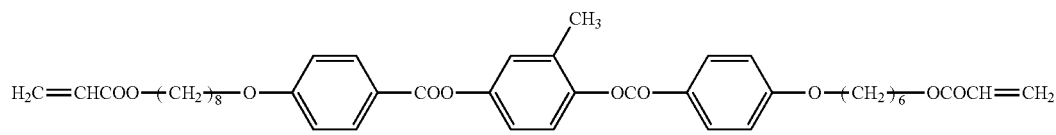

(4)
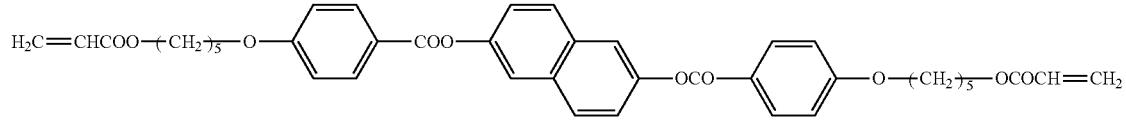

(5)
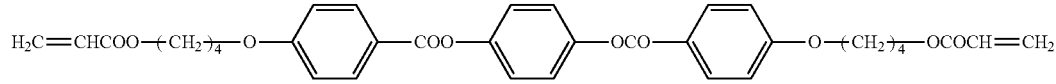

(6)
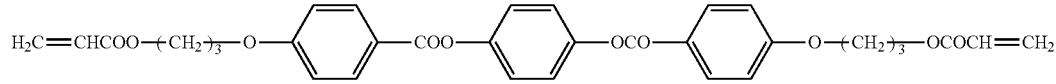

(7)
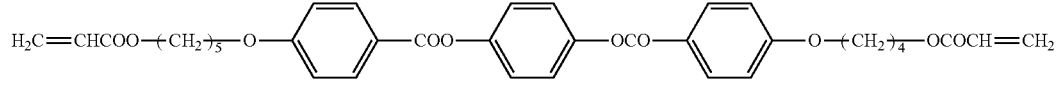

(8)
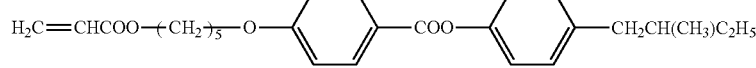

(9)
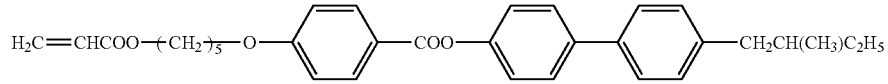

(10)

(11)
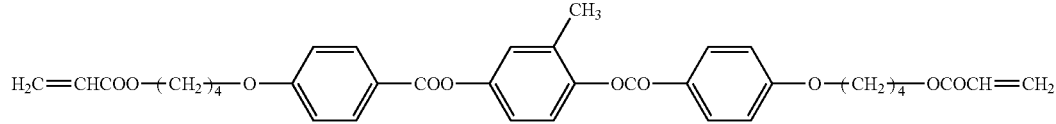

(12)
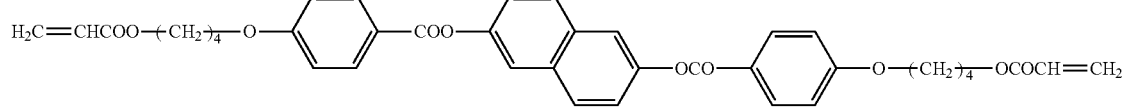

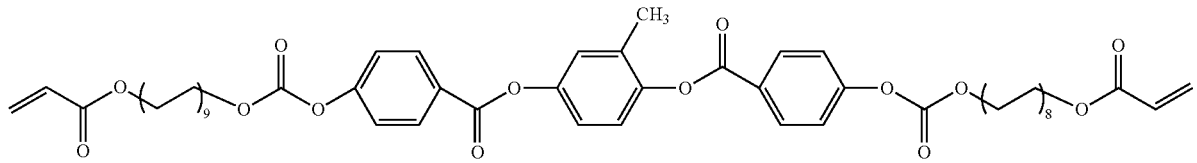

(13)

(g is an integer of 2 to 5)

The alignment film 68B is formed such that the liquid crystal material of the retardation layer 68C is aligned in a direction of 45° with respect to the polarization plane of the light reflected from the reflective polarizing plate 69. The alignment film 68B may employ a wide range of various configurations. For example, the alignment film 68B may be formed using an optical alignment film, may be formed by rubbing, and may be formed by molding a minute line-shaped uneven surface. Moreover, the retardation layer 68C may be formed by an optical alignment method using an optical alignment liquid crystal polymer having an optically aligning function, and in this case, the alignment film 68B may be omitted.

The retardation layer 68C may employ a wide range of various liquid crystal materials having reverse wavelength dispersion characteristics, which are used for these types of optical films.

Figure 12:
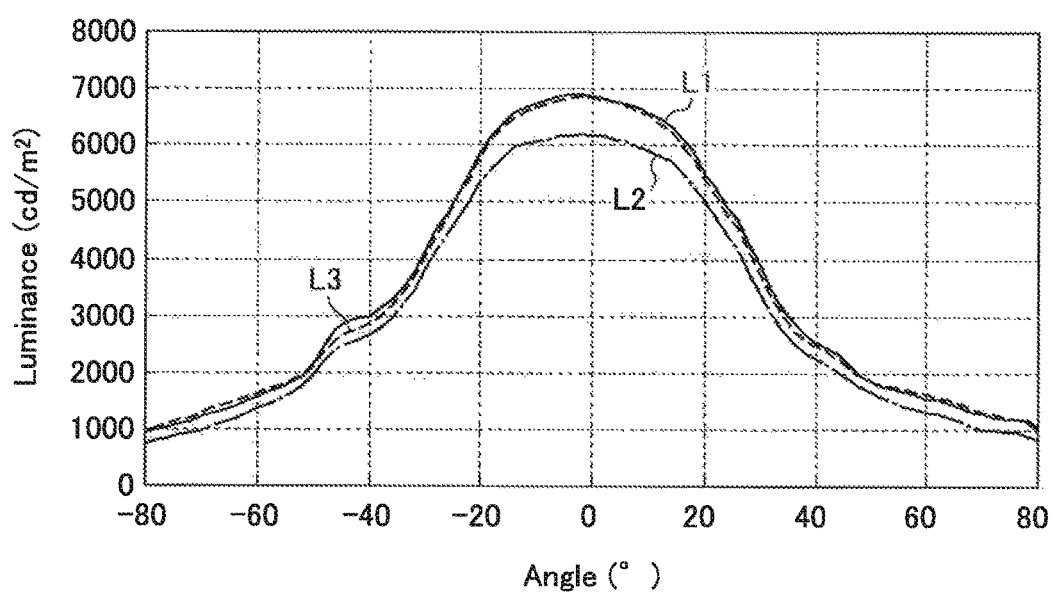
FIG. 12 is a characteristic curve diagram provided for describing the luminance of the liquid-crystal display apparatus of FIG. 10.

FIG. 12 is a characteristic curve diagram provided for describing the luminance of the liquid-crystal display apparatus 61. Symbol L1 indicates the measurement results of the liquid-crystal display apparatus 61 according to the present embodiment, symbol L2 indicates the measurement results when the ¼-wavelength plate was not provided, and symbol L3 indicates the measurement results when a ¼-wavelength plate having positive wavelength dispersion characteristics was disposed in the liquid-crystal display apparatus 61 of the present embodiment instead of the ¼-wavelength plate 68. Moreover, the horizontal axis represents an inclination (polar angle) from the front-surface direction, and the vertical axis represents luminance. According to the measurement results of FIG. 12, it can be understood that, when the ¼-wavelength plate is disposed, the luminance increases in the respective directions including the front-surface direction, and as a result, the illumination light utilization efficiency is improved. However, it was confirmed that there was not a substantial difference in the wavelength dispersion characteristics of the ¼-wavelength plate. The measurements were executed using EZcontrast (product of ELDIM Corporation) in a state in which the intensity of light exiting from the primary light source 11 is set to constant reference light intensity.

Figure 13:
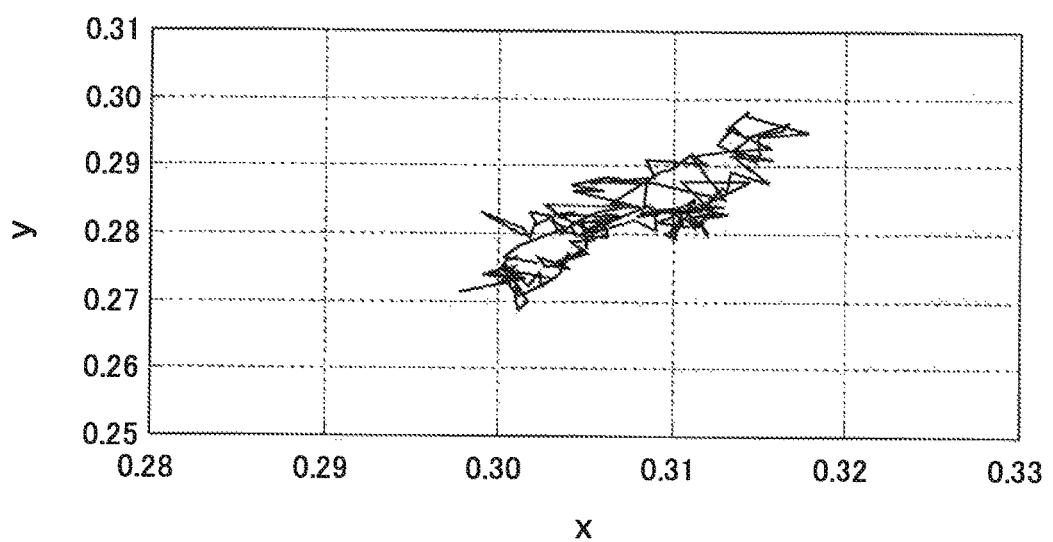
FIG. 13 is a diagram illustrating the viewing-angle characteristics when a ¼-wavelength plate is not provided.
Figure 14:
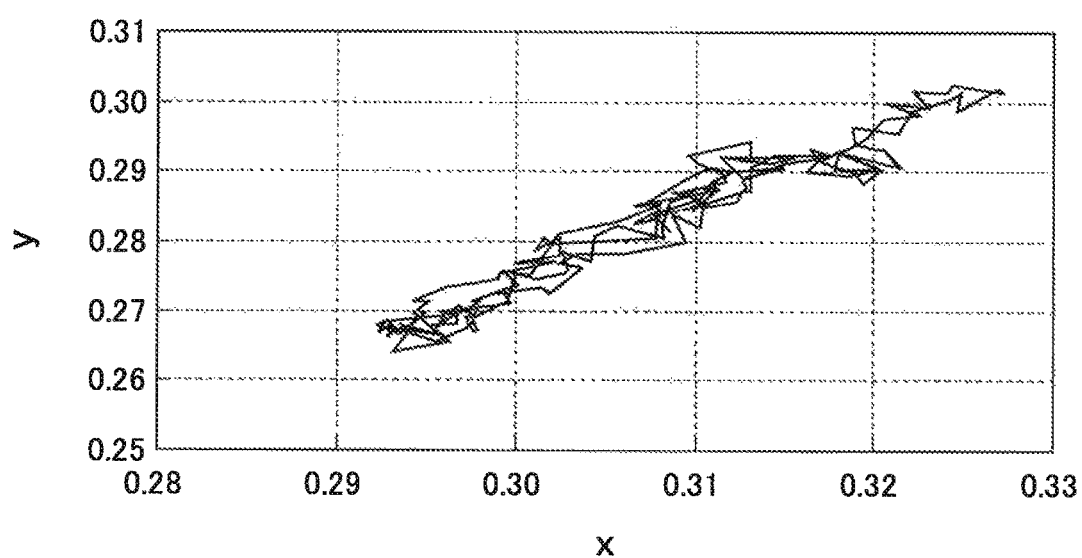
FIG. 14 is a diagram illustrating the viewing-angle characteristics when a ¼-wavelength plate has positive wavelength dispersion characteristics.
Figure 15:
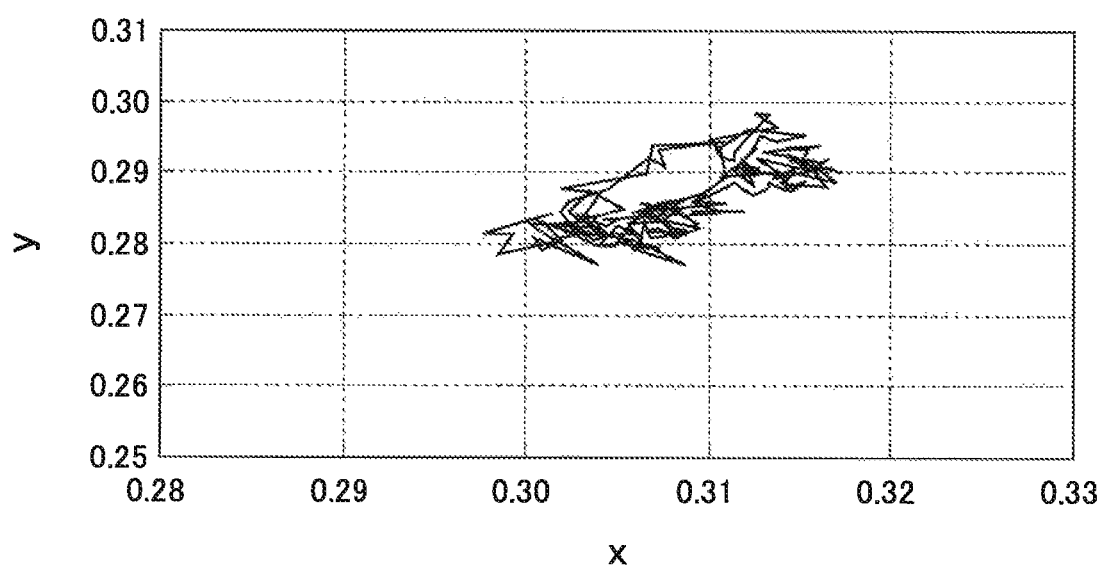
FIG. 15 is a diagram illustrating the viewing-angle characteristics of the liquid-crystal display apparatus of FIG. 10.

FIGS. 13 to 15 are diagrams illustrating the measurement results of color tints in a viewing direction, measured for three types of configurations of FIG. 12. The measurement results are measurement results of color tints of the display screen when the polar angle was maintained at 60° and the azimuthal angle was changed sequentially and gradually and are obtained by connecting the coordinates of the measurement results by lines in the order of measurements. The measurements were executed in the same manner as described in connection with FIG. 12. Moreover, the color coordinates were measured based on the CIE color system.

FIG. 13 illustrates the measurement results when the ¼-wavelength plate was not provided, and FIG. 14 illustrates the measurement results when a ¼-wavelength plate having positive wavelength dispersion characteristics was disposed instead of the ¼-wavelength plate 68. FIG. 15 illustrates the measurement results of the liquid-crystal display apparatus of the present embodiment. According to the measurement results of FIGS. 13 to 15, it can be understood that, when a ¼-wavelength plate having positive wavelength dispersion characteristics is provided, a change in color tints depending on the viewing direction is remarkable as compared to when no ¼-wavelength plate is provided, and that, when a ¼-wavelength plate having reverse wavelength dispersion characteristics is provided, it is possible to reduce a change in color tints depending on the viewing direction and to improve the viewing-angle characteristics associated with the color tints as compared to when a ¼-wavelength plate having a positive wavelength dispersion characteristics is provided and when no ¼-wavelength plate is provided.

In contrast, when the color tints in the front-surface direction were measured, the x and y-coordinate values were (0.299,0.275) when no ¼-wavelength plate was provided. However, the x and y-coordinate values changed to (0.302, 0.782) when a ¼-wavelength plate having positive wavelength dispersion characteristics was provided. As a result, yellowish color tints were observed on the display screen. In contrast, when a ¼-wavelength plate having reverse wavelength dispersion characteristics was provided, the x and y-coordinate values were (0.298,0.278). From this, it was confirmed that even when no ¼-wavelength plate was provided, it was possible to obtain color tints which approach the color tints of the display screen and to improve the color tints of the display screen.

In the measurements of FIGS. 12 to 15 and the measurements of color tints in the front-surface direction, the ¼-wavelength plate having positive wavelength dispersion characteristics and the ¼-wavelength plate having reverse wavelength dispersion characteristics were formed using a TAC film having a thickness of 60 µm at the base 68A of the configuration of FIG. 11. The base had an in-plane retardation Re of 0.6 nm and a thickness retardation Rth of 63 nm. Moreover, the light control sheets 64 to 67 were also formed using the TAC film.

The ¼-wavelength plate having positive wavelength dispersion characteristics was formed using an ordinary liquid crystal material for the retardation layer 68C, and R450/R550 was 1.09 and R650/R550 was 0.98. R450, R550, R650 are in-plane retardation values Re in wavelengths of 450 nm, 550 nm, and 650 nm, respectively. Moreover, the ¼-wavelength plate having reverse wavelength dispersion characteristics was formed using the liquid crystal material described above, and R450/R550 was 0.83 and R650/R550 was 1.06.

When the light-diffusing sheets 64 and 66 and the prism sheets 65 and 66 were formed using a polyethylene-terephthalate (PET) film (thickness: 50 µm, Re=2200 nm, A4300: product of Toyobo Co., Ltd.) which is a material having a large in-plane retardation as a base, it was not possible to obtain a luminance improving effect even when the ¼-wavelength plate was provided. From this, it was possible to sufficiently confirm the effect of forming the light control sheet using a material having refractive-index isotropy.

According to the above-described configuration, it is possible to improve color tints of the display screen in a configuration of improving the light utilization efficiency of the light exiting from the primary light source using a reflective polarizing plate by configuring the ¼-wavelength plate so as to exhibit reverse wavelength dispersion characteristics and using a material having refractive-index isotropy as various light control sheets disposed between the reflective polarizing plate and the light guide plate.

Moreover, since the ¼-wavelength plate is formed using a liquid crystal material having reverse wavelength dispersion characteristics, it is possible to configure the ¼-wavelength plate so as to exhibit reverse wavelength dispersion characteristics with a specific configuration.

(Eighth Embodiment)

Figure 16:
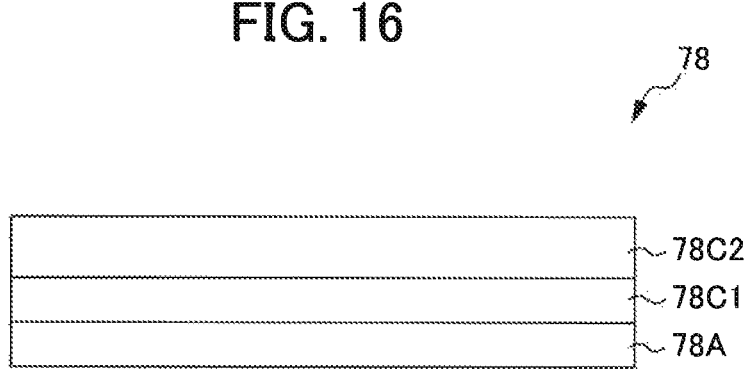
FIG. 16 is a cross-sectional view illustrating a ¼-wavelength plate used in the liquid-crystal display apparatus according to an eighth embodiment of the present invention.

FIG. 16 is a cross-sectional view illustrating a configuration of a ¼-wavelength plate used in a liquid-crystal display apparatus according to an eighth embodiment of the present invention. The liquid-crystal display apparatus 1 of the present embodiment has the same configuration as the liquid-crystal display apparatus 1 of the first embodiment except that a ¼-wavelength plate 78 illustrated in FIG. 16 is used instead of the ¼-wavelength plate 68.

Here, the ¼-wavelength plate 78 has a configuration in which a ¼-wavelength retardation layer 78C1 that applies a retardation of ¼ wavelength to transmission light and a ½-wavelength retardation layer 78C2 that applies a retardation of ½ wavelength to transmission light are sequentially stacked on a base 78A formed of a transparent film material having small optical anisotropy such as a TAC film.

Figure 17:
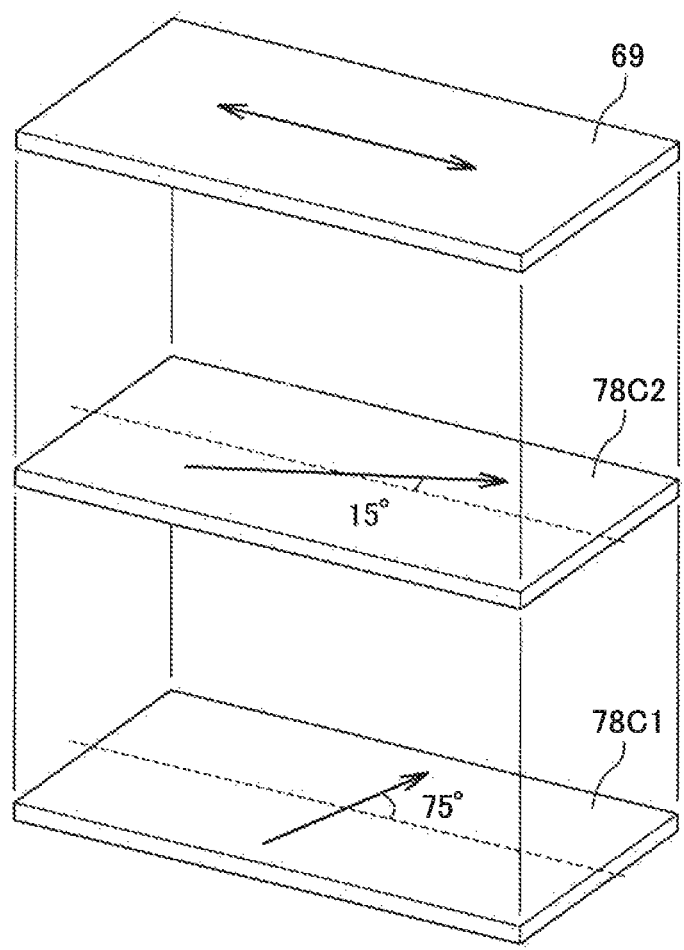
FIG. 17 is a diagram provided for describing the ¼-wavelength plate of FIG. 16.

Moreover, as illustrated in FIG. 17, the ½-wavelength retardation layer 78C2 and the ¼-wavelength retardation layer 78C1 are disposed so that the fast axes (indicated by arrows) thereof are at 15° and 75° with respect to the reflection axis of the reflective polarizing plate 69, indicated by an arrow. Due to this, the ¼-wavelength plate 78 is configured so as to exhibit reverse wavelength dispersion characteristics with respect to the light reflected from the reflective polarizing plate 69 due to the stacking of the ½-wavelength retardation layer 78C2 and the ¼-wavelength retardation layer 78C1.

The ½-wavelength retardation layer 78C2 and the ¼-wavelength retardation layer 78C1 may be formed so as to be sequentially stacked on the base 78A together with the corresponding alignment film. Alternatively, the retardation layers may be formed as separate layers, which are then stacked according to a transfer method so as to be integrated with the alignment film. Further alternatively, the retardation layers only may be stacked according to the transfer method. Moreover, the respective retardation layers may be formed in a manner similar to the retardation layer described in the seventh embodiment using a liquid crystal material having positive wavelength dispersion characteristics.

According to the present embodiment, even when the ¼-wavelength plate is formed by stacking a ½-wavelength retardation layer and a ¼-wavelength retardation layer, it is possible to obtain the same advantage as that of the seventh embodiment.

(Other Embodiment)

While the specific configuration of the embodiment of the present invention has been described in detail, the configuration of the above-described embodiment of the present invention may be modified into various forms without departing from the spirit of the present invention and can also be combined with the configuration of the related art.

That is, in the first embodiment, although a case in which the prism sheet and the ¼-wavelength plate are integrated has been described, the present invention is not limited to this, and the prism sheet and the ¼-wavelength plate may be separate members and the reflective polarizing plate and the ¼-wavelength plate may be integrated as long as practically sufficient characteristics can be secured.

Moreover, in the seventh and eighth embodiments, although a case in which the ¼-wavelength plate is formed using a retardation layer which is formed of a liquid crystal material has been described, the present invention is not limited to this; the ¼-wavelength plate may be formed using a retardation layer which is formed of a film material having reverse wavelength dispersion characteristics or a film material having flat wavelength dispersion characteristics. As such a film material, a biaxially or uniaxially stretched cyclic olefin polymer (COP) film or the like can be used, for example.

Moreover, in the seventh and eighth embodiments, although a case in which four light control sheets including the light-diffusing sheet 64, the upwardly convex prism sheet 65, the upwardly convex prism sheet 66, and the light-diffusing sheet 67 are disposed on the exit surface of the light guide plate has been described, the present invention is not limited to this but, for example, can be broadly applied to when a downwardly convex prism sheet is disposed instead of the upwardly convex prism sheet 65, when the light-diffusing sheet is omitted, when the light control sheet is disposed according to various configurations, and when the light control sheets having various configurations are disposed.

EXPLANATION OF REFERENCE NUMERALS 1, 21, 31, 41, 51, 61: Liquid-crystal display apparatus
2, 22, 32, 42, 52, 62: Backlight unit
3: Liquid-crystal display panel
4A, 4B: Glass plate
5: Liquid crystal
6: Liquid crystal cell
7A, 7B: Linear polarizing plate
11: Primary light source
12, 63: Light guide plate
13: Reflective sheet
14: Prism sheet
15, 45: ¼-wavelength plate
16, 69: Reflective polarizing plate
64, 67: Light-diffusing sheet
65, 66: Prism sheet
68, 78: ¼-wavelength plate
68A, 78A: Base
68B: Alignment film
68C: Retardation layer
78C1: ¼-wavelength retardation layer
78C2: ½-wavelength retardation layer

What is claimed is:

1. A backlight unit that supplies light exiting from an exit surface of a light guide plate to a liquid-crystal display panel via a reflective polarizing plate after correcting directivity of the exiting light using a prism sheet, the backlight unit comprising:

a reflective sheet disposed on a rear surface, a surface opposite the liquid-crystal display panel, of the light guide plate, the light guide plate which first receives the light supplied from a light source, the prism sheet having a repeated polygonal cross-sectional shape which receives the light before the reflective polarizing plate, a light-diffusing sheet between the prism sheet and a ¼ wavelength plate, the ¼ wavelength plate, and the reflective polarizing plate which receives the light after the prism sheet, wherein the prism sheet and the light diffusing sheet are formed of a material having refractive-index isotropy, whereby light which has been reflected from the reflective polarizing plate and has passed through the ¼-wavelength plate and the light which has been output from the light guide plate and enters the ¼-wavelength plate are suppressed from experiencing a retardation in the in-plane direction of the ¼-wavelength plate.

2. The backlight unit according to claim 1, wherein a base of the prism sheet has a retardation value Re of 20 nm or smaller.

3. The backlight unit according to claim 1, wherein the ¼-wavelength plate and the reflective polarizing plate are integrated with each other.

4. The backlight unit according to claim 1, wherein the prism sheet, the ¼-wavelength plate, and the reflective polarizing plate are integrated with each other.

5. The backlight unit according to claim 1, wherein the ¼-wavelength plate and the reflective sheet are integrated with each other.

6. A liquid-crystal display apparatus comprising: a liquid-crystal display panel stacked on the backlight unit according to claim 1.

7. The backlight unit according to claim 1, wherein the polygonal cross-sectional shape of the convex structure of the prism sheet is triangular.

8. A liquid-crystal display apparatus comprising: a liquid-crystal display panel, a reflective polarizing plate, a ¼-wavelength plate that applies a retardation of ¼ wavelength to transmission light, a light-diffusing sheet, a light control sheet that controls directivity of transmission light, and a light guide plate, which are sequentially stacked, wherein the ¼-wavelength plate exhibits reverse wavelength dispersion characteristics with respect to light reflected from the reflective polarizing plate so that a retardation applied to transmission light increases as the wavelength of the transmission light increases, the light control sheet is a prism sheet formed of a material having refractive-index isotropy, wherein the prism sheet and the ¼-wavelength plate are integrated with each other wherein the light control sheet is a prism sheet in which a convex structure having a polygonal cross-sectional shape is repeatedly formed on a light entrance surface or a light exit surface, wherein the prism sheet and the light diffusing sheet are formed of a material having refractive-index isotropy, whereby light which has been reflected from the reflective polarizing plate and has passed through the ¼-wavelength plate and the light which has been output from the light guide plate and enters the ¼-wavelength plate are suppressed from experiencing a retardation in the in-plane direction of the ¼-wavelength plate.

9. The liquid-crystal display apparatus according to claim 8, wherein the ¼-wavelength plate includes:

a transparent base;

an alignment film formed on the transparent base; and a retardation layer formed of a liquid crystal material having reverse wavelength dispersion characteristics and cured in a state in which the liquid crystal material is aligned by alignment restricting force of the alignment film.

10. The liquid-crystal display apparatus according to claim 8, wherein the ¼-wavelength plate is a stacked structure including:

a ½-wavelength retardation layer that applies a retardation of ½ wavelength to transmission light; and a ¼-wavelength retardation layer that applies a retardation of ¼ wavelength to transmission light.

11. A liquid-crystal display apparatus comprising: a liquid-crystal display panel, a reflective polarizing plate, a ¼-wavelength plate that applies a retardation of ¼ wavelength to transmission light, a light-diffusing sheet, a light control sheet that controls directivity of transmission light, and a light guide plate which are sequentially stacked, wherein the ¼-wavelength plate exhibits reverse wavelength dispersion characteristics with respect to light reflected from the reflective polarizing plate so that a retardation applied to transmission light increases as the wavelength of the transmission light increases, the light control sheet is formed of a material having refractive-index isotropy, and wherein the light control sheet is a prism sheet in which a convex structure having a polygonal cross-sectional shape is repeatedly formed on a light entrance surface, wherein the prism sheet and the light diffusing sheet are formed of a material having refractive-index isotropy, whereby light which has been reflected from the reflective polarizing plate and has passed through the ¼-wavelength plate and the light which has been output from the light guide plate and enters the ¼-wavelength plate are suppressed from experiencing a retardation in the in-plane direction of the ¼-wavelength plate.

* * * * *